United States Patent
Kerr et al.

(10) Patent No.: US 8,364,702 B2
(45) Date of Patent: Jan. 29, 2013

(54) APPLICANT QUALIFICATION PROCESS

(75) Inventors: Larry Kerr, Moline, IL (US); Craig Mowers, Sherrard, IL (US); Paul Kuhel, Bettendorf, IA (US); Steve Schauer, Davenport, IA (US)

(73) Assignee: EBE, Inc., East Moline, IL (US)

( * ) Notice: Subject to any disclaimer, the term of this patent is extended or adjusted under 35 U.S.C. 154(b) by 135 days.

(21) Appl. No.: 13/029,526

(22) Filed: Feb. 17, 2011

(65) Prior Publication Data

US 2011/0289107 A1   Nov. 24, 2011

Related U.S. Application Data

(60) Provisional application No. 61/345,835, filed on May 18, 2010.

(51) Int. Cl.
*G06F 17/30* (2006.01)
*G06F 17/00* (2006.01)
*G06Q 10/00* (2012.01)

(52) U.S. Cl. ........ 707/769; 707/784; 705/7.42; 715/200

(58) Field of Classification Search .............. 707/769, 707/783, 784; 715/200; 705/7.42
See application file for complete search history.

(56) References Cited

U.S. PATENT DOCUMENTS

| 6,332,098 | B2 * | 12/2001 | Ross et al. ............... 700/226 |
| 6,772,130 | B1 * | 8/2004 | Karbowski et al. .......... 705/26.1 |
| 7,505,919 | B2 * | 3/2009 | Richardson ............... 705/7.14 |
| 7,844,481 | B2 * | 11/2010 | Hilbush et al. ............. 705/7.13 |
| 8,073,723 | B1 * | 12/2011 | Bilibin et al. ............. 705/7.13 |
| 2002/0165752 | A1 * | 11/2002 | Miller ................. 705/8 |
| 2003/0004738 | A1 * | 1/2003 | Chandar ................ 705/1 |
| 2005/0177408 | A1 * | 8/2005 | Miller .................. 705/8 |
| 2009/0138450 | A1 * | 5/2009 | Richardson .............. 707/3 |
| 2009/0204471 | A1 * | 8/2009 | Elenbaas et al. ............ 705/9 |

* cited by examiner

*Primary Examiner* — Cheryl Lewis
(74) *Attorney, Agent, or Firm* — Lane & Waterman LLP

(57) ABSTRACT

A system, computer-readable medium, and method for automatically determining if an applicant is qualified to perform a task are provided. In the method, an application including applicant identifier information identifying an applicant is received by a computing device. The applicant identifier information is extracted from the received application. A query to a database including the extracted applicant identifier information is created and sent to a database system using a network. The database system stores data associated with the extracted applicant identifier information. A response to the query is received from the database system using the network. The response includes data associated with the applicant's qualification to perform a task. Whether or not the applicant is qualified to perform the task is determined by comparing the data associated with the applicant's qualification to a predetermined qualification criterion.

19 Claims, 9 Drawing Sheets

APPLICANT QUALIFICATION PROCESS

CROSS-REFERENCE TO RELATED APPLICATIONS

This application claims the benefit of U.S. Provisional Patent Application Ser. No. 61/345,835 that was filed May 18, 2010, the disclosure of which is incorporated herein by reference in its entirety.

BACKGROUND

The transportation industry in the United States is a highly regulated and complex industry in which various tasks must be performed by multiple parties to ensure the safe, cost effective, precise, and timely delivery of goods. Hiring and on-boarding truck drivers is the process of coordinating recruiters and sellers to hire the most qualified applicants from a pool of drivers to ensure the safety of the public and the continuation of the carrier or trucking company. Various data must be collected from the driver applicant, as well as from criminal databases, credit reports, driving records, and previous employers to determine if the applicant is qualified depending on the driver status such as student, interstate, or hazardous material. Different requirements are placed upon the carrier to hire the appropriate driver with specific endorsements, experience, and criminal behavior. Therefore, the eligibility of the driver must be evaluated against the standards set by the carrier's requirements for a particular driving task.

Finally, many documents, certifications, and agreements must be either signed or verified to qualify a driver or a carrier to carry a shipment. Often the pressure on recruiters to fill trucks with drivers, or an agent for a logistics company's motivation to sell freight and increase commissions compels them to cut corners and not follow established policies. Timeliness also plays a key role in transportation because the first offer for employment or acceptance of a shipment often receives the contract. As a result, "best practices" have been difficult to enforce because there was no system that required that a process be followed or gave management visibility to those who ignored policies. In addition, there was no way to communicate and make automated the decision process between disparate systems and content contained on paper.

In the conventional process, a carrier of goods manually collects information from the driver, from governmental and other third party databases regarding licensure, previous employers, and other applicable information. After the collection of this disparate data, the carrier manually reviews the information and determines whether the driver is eligible or otherwise suitable to transport freight. If the driver is deemed eligible, the carrier manually creates the appropriate contracts and documentation and sends it to the driver for acceptance and signature, usually via the United States Postal Service or facsimile. The carrier waits until the driver returns all of the documentation and manually analyzes the returned documents to determine if the driver properly executed and returned the necessary forms. The carrier manually creates an orientation date and documents and enters data for driver information into the dispatching system to facilitate dispatches. A particular carrier may have its own requirements for all drivers transporting goods that differ from the requirements of other transportation carriers.

Drivers may become ineligible to transport freight due to a change in the driver's safety, health, criminal activity, financial, or certification status. There is currently no efficient way to determine and communicate the current status of a previously approved driver or remove the driver from the active eligible driver pool if the driver no longer meets the qualifying requirements for the transportation task.

Logistics management is the process of coordinating and facilitating the pickup, shipment, and delivery of goods. Depending on the type of goods shipped, requirements are placed upon the carrier or trucking company. For example, some carriers and their equipment may not be suitable for the delivery of milk, but may be suitable for the delivery of clothing. Different shippers also screen their carriers based upon safety and security by checking the carrier's driving record, insurance status, driving experience, etc. Additionally, various trucking companies or individual carriers qualify for the shipment of certain goods, along certain routes, but do not qualify to ship the same goods on other routes. Therefore, an evaluation of the eligibility of the carrier or their trucking company is evaluated against the shipment load, route, and requirements for a particular shipment. Thus, similar to a driver's eligibility to work for a carrier, a carrier may be selected by a manufacturer to support shipment of the manufacturer's goods to various customers.

SUMMARY

In an example embodiment, a method for automatically determining if an applicant is qualified to perform a task is provided. An application including applicant identifier information identifying an applicant is received by a computing device. The applicant identifier information is extracted from the received application. A query to a database including the extracted applicant identifier information is created and sent to a database system using a network. The database system stores data associated with the extracted applicant identifier information. A response to the query is received from the database system using the network. The response includes data associated with the applicant's qualification to perform a task. Whether or not the applicant is qualified to perform the task is determined by comparing the data associated with the applicant's qualification to a predetermined qualification criterion.

In another example embodiment, a non-transitory computer-readable medium is provided having stored thereon computer-readable instructions that when executed by a computing device, cause the computing device to perform the method of automatically determining if an applicant is qualified to perform a task.

In yet another example embodiment, a system is provided. The system includes, but is not limited to, a processor and the computer-readable medium operably coupled to the processor. The computer-readable medium has instructions stored thereon that when executed by the processor, cause the system to perform the method of automatically determining if an applicant is qualified to perform a task.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

DETAILED DESCRIPTION

Figure 1:
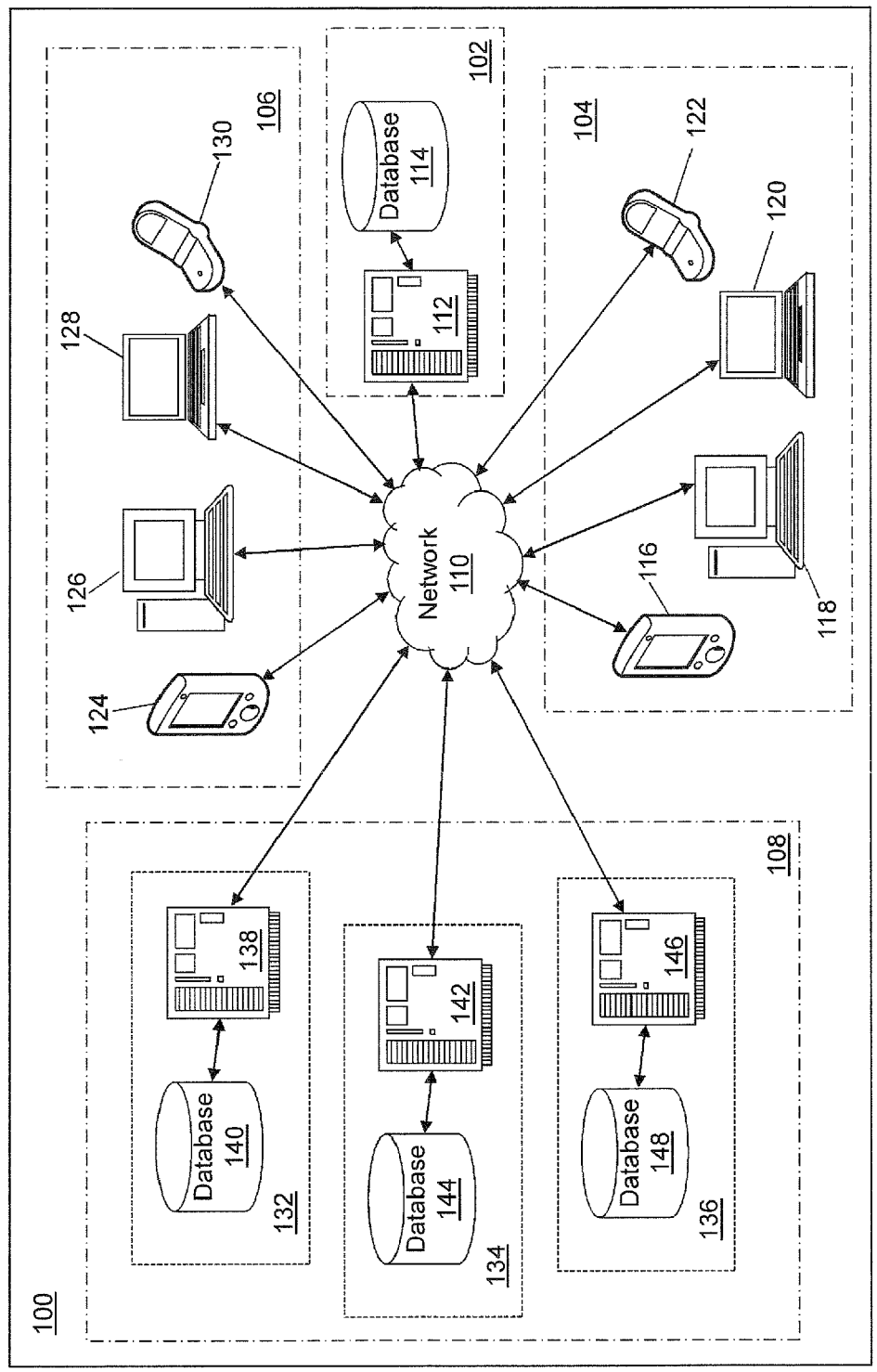
FIG. 1 depicts a block diagram of an applicant qualification system in accordance with an example embodiment.

With reference to FIG. 1, a block diagram of an applicant qualification system 100 is shown in accordance with an illustrative embodiment. In an illustrative embodiment, applicant qualification system 100 may include a data processing system 102, a plurality of applicant systems 104, a plurality of evaluator systems 106, a plurality of third party database systems 108, and a network 110. Network 110 may include one or more networks of the same or different types. Network 110 can be any type of wired and/or wireless public or private network including a cellular network, a local area network, a wide area network such as the Internet, etc. Network 110 further may be comprised of sub-networks and consist of any number of devices.

Data processing system 102 may include a server computing device 112 and a database 114. Server computing device 112 may be a computer of any form factor. Data processing system 102 further may include a plurality of server computing devices that may be connected directly or through network 110. Server computing device 112 includes or can access database 114 either through a direct connection or through network 110.

Database 114 is a data repository for applicant qualification system 100. Database 114 may include a plurality of databases that may be organized into multiple database tiers to improve data management and access. Database 114 may utilize various database technologies and a variety of different formats as known to those skilled in the art including a file system, a relational database, a system of tables, a structured query language database, etc. Database 114 may be implemented as a single database or as multiple databases stored in different storage locations distributed over the Internet or other heterogeneous storage infrastructures.

The plurality of applicant systems 104 may include one or more computing devices. The one or more computing devices send and receive signals through network 110 to/from another of the one or more computing devices and/or to/from data processing system 102 and/or to/from the plurality of evaluator systems 106. The plurality of applicant systems 104 can include any number and type of computing devices. The one or more computing devices may include computers of any form factor such as a personal digital assistant 116, a desktop 118, a laptop 120, an integrated messaging device, a cellular telephone 122, a smart phone, a pager, etc. The plurality of applicant systems 104 may include additional types of devices.

The plurality of evaluator systems 106 may include one or more computing devices. The one or more computing devices send and receive signals through network 110 to/from another of the one or more computing devices and/or to/from data processing system 102 and/or to/from the plurality of applicant systems 104. The plurality of evaluator systems 106 can include any number and type of computing devices that may be organized into subnets. The one or more computing devices may include computers of any form factor such as a personal digital assistant 124, a desktop 126, a laptop 128, an integrated messaging device, a cellular telephone 130, a smart phone, a pager, etc. The plurality of evaluator systems 106 may include additional types of devices.

The one or more computing devices communicate using various transmission media that may be wired or wireless as known to those skilled in the art. The one or more computing devices may communicate information as peers in a peer-to-peer network using network 110. An applicant may use a computing device of the plurality of applicant systems 104 to send information related to an application, to receive information related to a status of the application, to receive documents for signature, etc. An evaluator may use a computing device of the plurality of evaluator systems 106 to send and receive information related to an application. An evaluator may review the application to make sure that no additional information is required.

The plurality of third party database systems 108 may include one or more computing devices that include a database or through which a database can be accessed. Applicant qualification system 100 may include any number of third party database systems without limitation. The one or more computing devices send and receive signals through network 110 to/from data processing system 102. The plurality of third party database systems 108 can include any number and type of computing devices. For example, in the illustrative embodiment of FIG. 1, the plurality of third party database systems 108 includes a first database system 132, a second database system 134, and a third database system 136. First database system 132 may include a first server computing device 138 and a first database 140. Second database system 134 may include a second server computing device 142 and a second database 144. Third database system 136 may include a third server computing device 146 and a third database 148.

First server computing device 138, second server computing device 142, and third server computing device 146 may be computers of any form factor and of the same or different form factors and may include a plurality of server computing devices that may be connected directly or through network 110. First server computing device 138, second server computing device 142, and third server computing device 146 includes or can access first database 140, second database 144, and third database 148, respectively, either through a direct connection or through network 110.

First database 140 is a data repository for first database system 132 and may include a plurality of databases that may be organized into multiple database tiers to improve data management and access. First database 140 may utilize various database technologies and a variety of different formats as known to those skilled in the art including a file system, a relational database, a system of tables, a structured query language database, etc.

Second database 144 is a data repository for second database system 134 and may include a plurality of databases that may be organized into multiple database tiers to improve data management and access. Second database 144 may utilize various database technologies and a variety of different formats as known to those skilled in the art including a file system, a relational database, a system of tables, a structured query language database, etc.

Third database 148 is a data repository for third database system 136 and may include a plurality of databases that may be organized into multiple database tiers to improve data management and access. Third database 148 may utilize various database technologies and a variety of different formats as known to those skilled in the art including a file system, a relational database, a system of tables, a structured query language database, etc.

The components of applicant qualification system 100 may be positioned in a single location, a single facility, and/or may be remote from one another. For example, the plurality of applicant systems 104 and the plurality of third party database systems 108 may be remote from the plurality of evaluator systems 106 and/or data processing system 102. Further, systems of the plurality of evaluator systems 106 may be remote from each other and/or data processing system 102. Additionally, components of applicant qualification system 100 may be integrated in into a single computing device. For example, database 114 and/or an evaluator system of the plurality of evaluator systems 106 may be integrated in a single computing device. One or more of the components of applicant qualification system 100 may be connected directly, for example, using a cable for transmitting information between systems. One or more of the components of applicant qualification system 100 may be connected using network 110 without limitation.

Figure 2:
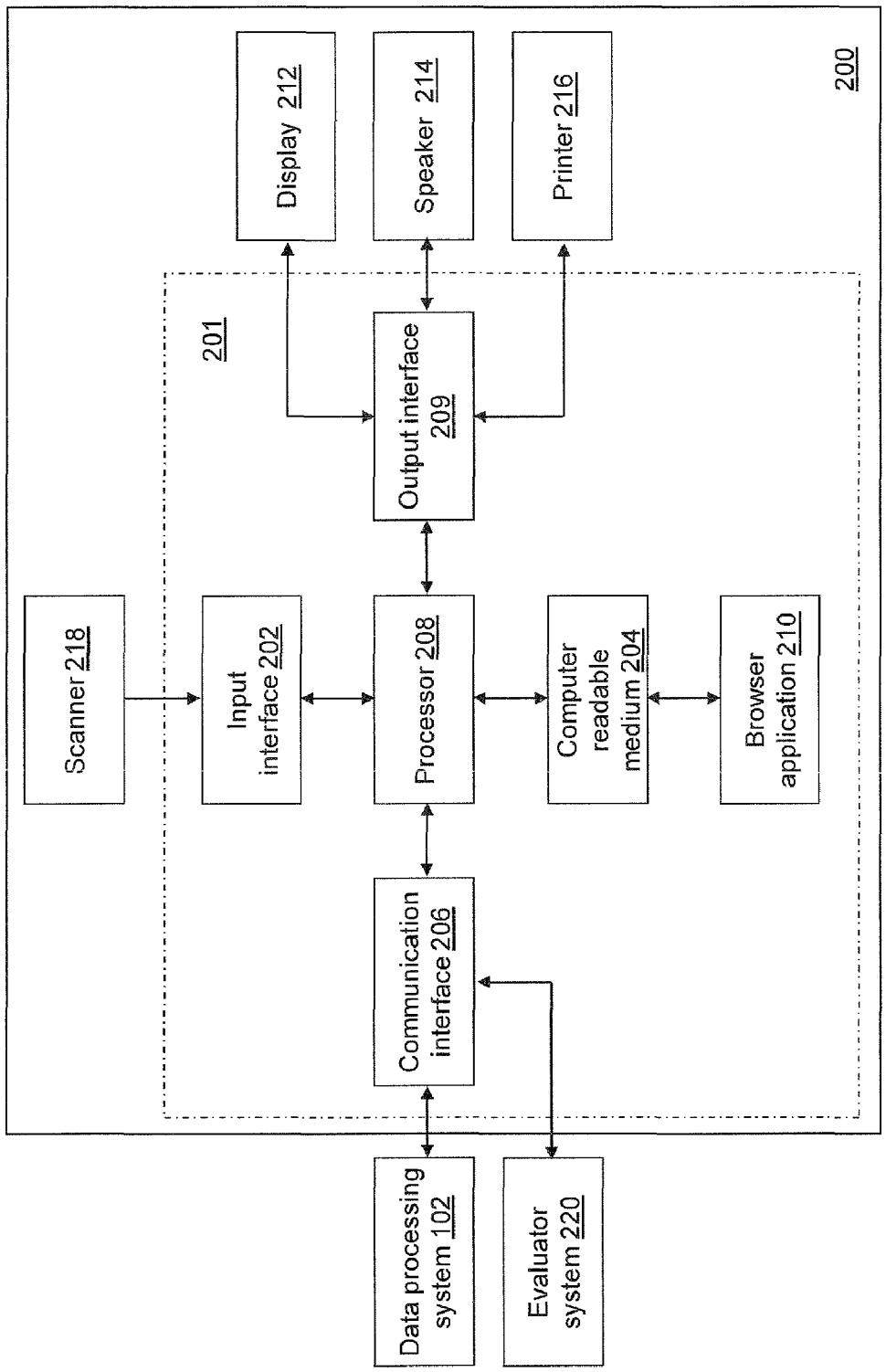
FIG. 2 depicts a block diagram of an applicant system of the applicant qualification system of FIG. 1 in accordance with an example embodiment.

With reference to FIG. 2, a block diagram of an applicant device 201 of an applicant system 200 is shown in accordance with an example embodiment. Applicant system 200 is an example computing system of the plurality of applicant systems 104. Applicant system 200 may include applicant device 201, a display 212, a speaker 214, a printer 216, and a scanner 218. Applicant device 201 may include an input interface 202, a computer-readable medium 204, a communication interface 206, a processor 208, an output interface 209, and a browser application 210. Different and additional components may be incorporated into applicant system 200 and/or applicant device 201.

Input interface 202 provides an interface for receiving information from the applicant for entry into applicant device 201 as known to those skilled in the art. Input interface 202 may use various input technologies including, but not limited to, a keyboard, a pen and touch screen, a mouse, a track ball, a touch screen, a keypad, one or more buttons, etc. to allow the applicant to enter information into applicant device 201 or to make selections presented in a user interface displayed on display 212. The same interface may support both input interface 202 and output interface 200. For example, a touch screen both allows applicant input and presents output to the applicant. Applicant device 201 may have one or more input interfaces that use the same or a different input interface technology.

Input interface 202 further provides an interface for receiving information from scanner 218. Scanner 218 may be any type of scanner that optically scans images, printed text, handwriting, or an object, and converts it to a digital image that is input to applicant device 201 through input interface 202. Scanner 218 further may format the scanned information into an extensible (XML) up language data file, email or smart print the information. For example, an applicant may scan a document to include a hand written signature on the document for submission to data processing system 102 or to an evaluator system 220.

Computer-readable medium 204 is an electronic holding place or storage for information so that the information can be accessed by processor 208 as known to those skilled in the art. Computer-readable medium 204 can include, but is not limited to, any type of random access memory (RAM), any type of read only memory (ROM), any type of flash memory, etc. such as magnetic storage devices (e.g., hard disk, floppy disk, magnetic strips, . . . ), optical discs (e.g., CD, DVD, . . . ), smart cards, flash memory devices, etc. Applicant device 201 may have one or more computer-readable media that use the same or a different memory media technology. Applicant device 201 also may have one or more drives that support the loading of a memory media such as a CD or DVD.

Communication interface 206 provides an interface for receiving and transmitting data between devices using various protocols, transmission technologies, and media as known to those skilled in the art. Communication interface 206 may support communication using various transmission media that may be wired or wireless. Applicant device 201 may have one or more communication interfaces that use the same or a different communication interface technology. Data and messages may be transferred between applicant system 200 and data processing system 102 and/or evaluator system 220 using communication interface 206.

Processor 208 executes instructions as known to those skilled in the art. The instructions may be carried out by a special purpose computer, logic circuits, or hardware circuits. Thus, processor 208 may be implemented in hardware, firmware, or any combination of these methods and/or in combination with software. The term "execution" is the process of running an application or the carrying out of the operation called for by an instruction. The instructions may be written using one or more programming language, scripting language, assembly language, etc. Processor 208 executes an instruction, meaning that it performs/controls the operations called for by that instruction. Processor 208 operably couples with output interface 209, with input interface 202, with computer-readable medium 204, and with communication interface 206 to receive, to send, and to process information. Processor 208 may retrieve a set of instructions from a permanent memory device and copy the instructions in an executable form to a temporary memory device that is generally some form of RAM. Applicant device 201 may include a plurality of processors that use the same or a different processing technology.

Output interface 209 provides an interface for outputting information for review by an applicant of applicant device 201. For example, output interface 209 may include an interface to display 212, speaker 214, printer 216, etc. Display 212 may be a thin film transistor display, a light emitting diode display, a liquid crystal display, or any of a variety of different displays known to those skilled in the art. Speaker 214 may be any of a variety of speakers as known to those skilled in the art. Printer 216 may be any of a variety of printers as known to those skilled in the art. Applicant device 201 may have one or more output interfaces that use the same or a different interface technology. Display 212, speaker 214, and/or printer 216 further may be accessible to applicant device 201 through communication interface 206.

Browser application 210 performs operations associated with retrieving, presenting, and traversing information resources provided by a web application and/or web server as known to those skilled in the art. An information resource is identified by a uniform resource identifier (URI) and may be a web page, web portal, image, video, or other piece of content. Hyperlinks in resources enable applicants to navigate to related resources. Example browser applications 210 include Navigator by Netscape Communications Corporation, Firefox® by Mozilla Corporation, Opera by Opera Software Corporation, Internet Explorer® by Microsoft Corporation, Safari by Apple Inc., Chrome by Google Inc., etc. as known to those skilled in the art.

Browser application 210 may be configured to receive and to send hypertext transport protocol (HTTP) messages along with optional additional data content which may include web pages such as hypertext markup language (HTML) documents and linked objects from/to server computing device 112 and/or evaluator system 220. Browser application 210 further may provide information or data through a web portal accessible over network 110. The web portal may comprise multiple web pages that display a specific set of information and may contain hyperlinks to other web pages with related or additional information. The applicant may log in to the web portal as understood by a person of skill in the art and enter data into fields or make selections from fields presented in one or more user interfaces created by browser application 210 under control of the web portal or website. Each web page of the web portal or website is identified by a uniform resource locator (URL) that includes the location or address of the computing device that contains the resource to be accessed in addition to the location of the resource on that computing device. The type of file or resource depends on the Internet application protocol. For example, HTTP and HTTP secure (HTTPS) describe a web page to be accessed with a browser application. The file accessed may be a simple text file, an image file, an audio file, a video file, an executable, a common gateway interface application, a Java applet, or any other type of file supported by HTTP.

Figure 3:
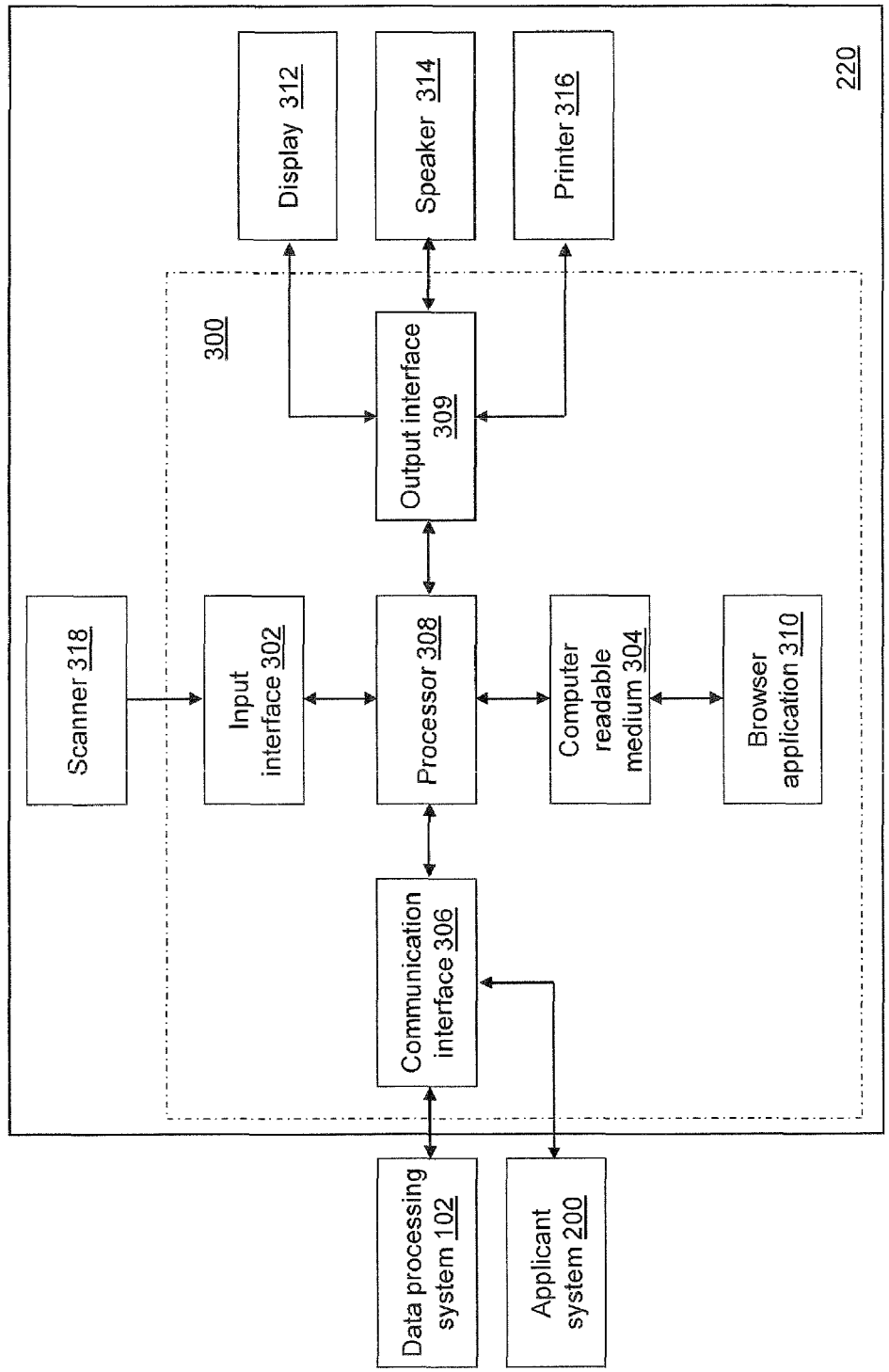
FIG. 3 depicts a block diagram of an evaluator system of the applicant qualification system of FIG. 1 in accordance with an example embodiment.

With reference to FIG. 3, a block diagram of an evaluator device 300 of evaluator system 220 is shown in accordance with an example embodiment. Evaluator system 220 is an example computing system of the plurality of evaluator systems 106. Evaluator system 220 may include evaluator device 300, a second display 312, a second speaker 314, a second printer 316, and a second scanner 318. Evaluator device 300 may include a second input interface 302, a second computer-readable medium 304, a second communication interface 306, a second processor 308, a second output interface 309, and a second browser application 310. Different and additional components may be incorporated into evaluator system 220 and/or evaluator device 300.

Second display 312 provides the same or similar functionality as that described with reference to display 212. Second speaker 314 provides the same or similar functionality as that described with reference to speaker 214. Second printer 316 provides the same or similar functionality as that described with reference to printer 216. Second scanner 318 provides the same or similar functionality as that described with reference to scanner 218. Second input interface 302 provides the same or similar functionality as that described with reference to input interface 202 of applicant device 201. Second computer-readable medium 304 provides the same or similar functionality as that described with reference to computer-readable medium 204 of applicant device 201. Second communication interface 306 provides the same or similar functionality as that described with reference to communication interface 206 of applicant device 201. Second processor 308 provides the same or similar functionality as that described with reference to processor 208 of applicant device 201. Second output interface 300 provides the same or similar functionality as that described with reference to output interface 209 of applicant device 201. Second browser application 310 provides the same or similar functionality as that described with reference to browser application 210 of applicant device 201. Second browser application 310 may provide access to a web portal that provides the same or a different user interface than that provided to a user of applicant device 201, for example, based on the user login information or the accessed URL.

Figure 4:
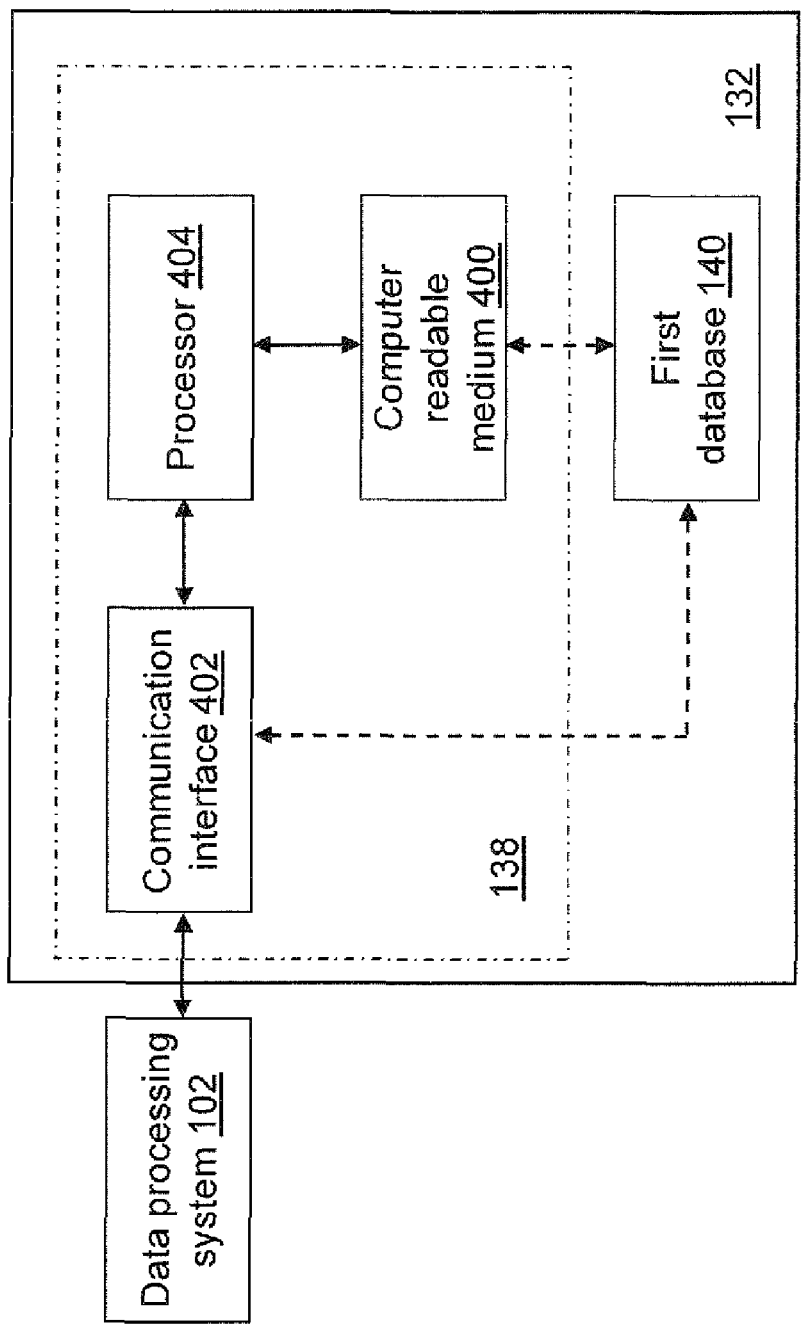
FIG. 4 depicts a block diagram of a third party database system of the applicant qualification system of FIG. 1 in accordance with an example embodiment.

With reference to FIG. 4, a block diagram of first server computing device 138 of first database system 132 is shown in accordance with an example embodiment. First server computing device 138 may include a third computer-readable medium 400, a third communication interface 402, and a third processor 404. Different and additional components may be incorporated into first server computing device 138. For example, first server computing device 138 may further include an input interface or an output interface. Third computer-readable medium 400 may provide the electronic storage medium for first database 140. Additionally, or in the alternative, first server computing device 138 may access first database 140 through third communication interface 402.

Third computer-readable medium 400 provides the same or similar functionality as that described with reference to computer-readable medium 204 of applicant device 201. Third communication interface 402 provides the same or similar functionality as that described with reference to communication interface 206 of applicant device 201. Third processor 404 provides the same or similar functionality as that described with reference to processor 208 of applicant device 201. First server computing device 138 may further include an application that performs operations associated with querying first database 140 and with receiving data from first database 140. The application may be integrated with first database 140. The operations may be implemented using hardware, firmware, software, or any combination of these methods.

Figure 5:
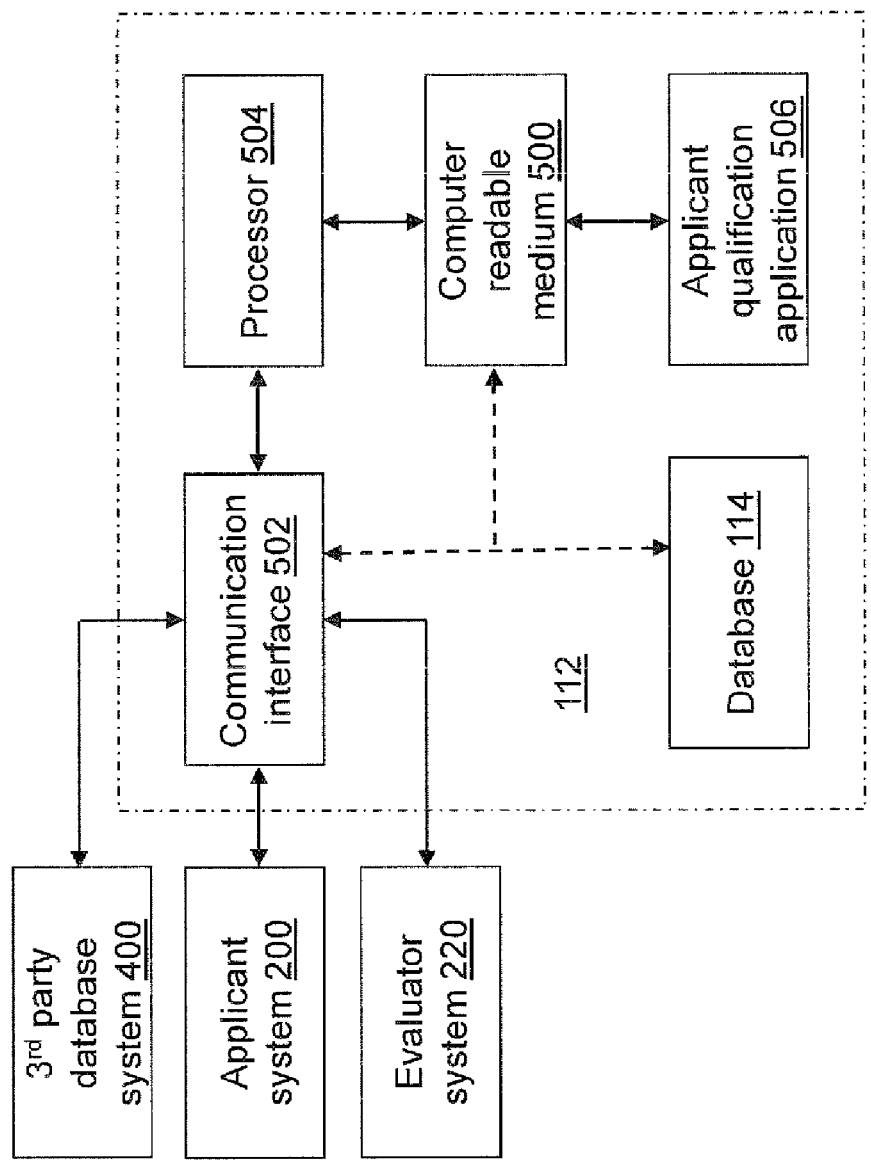
FIG. 5 depicts a block diagram of a data processing system of the applicant qualification system of FIG. 1 in accordance with an example embodiment.

With reference to FIG. 5, a block diagram of server computing device 112 of data processing system 102 is shown in accordance with an example embodiment. Server computing device 112 may include a fourth computer-readable medium 500, a fourth communication interface 502, a fourth processor 504, and an applicant qualification application 506. Different and additional components may be incorporated into server computing device 112. For example, server computing device 112 may further include an input interface or an output interface. Fourth computer-readable medium 500 may provide the electronic storage medium for database 114. Additionally, or in the alternative, server computing device 112 may access database 114 through fourth communication interface 502.

Fourth computer-readable medium 500 provides the same or similar functionality as that described with reference to computer-readable medium 204 of applicant device 201. Fourth communication interface 502 provides the same or similar functionality as that described with reference to communication interface 206 of applicant device 201. Fourth processor 504 provides the same or similar functionality as that described with reference to processor 208 of applicant device 201.

Applicant qualification application 506 performs operations associated with determining if an applicant is qualified to perform a task. In an illustrative embodiment, the task is transportation of an item from a first location to one or more second locations using a vehicle, and the applicant is a driver or a carrier. Some or all of the operations described herein may be embodied in applicant qualification application 506. The operations may be implemented using hardware, firmware, software, or any combination of these methods.

With reference to the example embodiment of FIG. 5, applicant qualification application 506 is implemented in software (comprised of computer-readable and/or computer-executable instructions) stored in fourth computer-readable medium 500 and accessible by fourth processor 504 for execution of the instructions that embody the operations of applicant qualification application 506. Applicant qualification application 506 may be written using one or more programming languages, assembly languages, scripting languages, etc. Applicant qualification application 506 may support the web portal accessed by applicant device 200 and/or evaluator device 300 and/or may query first database 140, second database 144, third database 148, etc.

With reference to FIGS. 6a, 6b, 6c, and 6d, illustrative operations associated with applicant qualification application 506 are described. Additional, fewer, or different operations may be performed depending on the embodiment. The order of presentation of the operations described with reference to FIGS. 6a-6d are not intended to be limiting. Thus, although some of the operational flows are presented in sequence, the various operations may be performed in various repetitions, concurrently, and/or in other orders than those that are illustrated. Additionally, the illustrative operations may be distributed among a plurality of modules that together comprise applicant qualification application 506.

In an operation 600, an application is received from an applicant. For example, the applicant may "login" to a web portal hosted by server computing device 112 under control of applicant qualification application 506 as known to a person of skill in the art. After logging in to the web portal, the applicant may answer questions presented in a form thereby entering data into the application under control of applicant qualification application 506. The applicant may also upload data to server computing device 112 under control of applicant qualification application 506. For example, the applicant may select a resume or certification document for upload to server computing device 112.

Thus, the application is received from the applicant by server computing device 112 and may be stored in database 114. The application also may be received by server computing device 112 using a facsimile machine. Optical character recognition may be used to electronically extract the application information from the received facsimile or someone may enter the application information into the form from the received facsimile. The application also may be received through the mail. Optical character recognition may be used to electronically extract the application information from the received mail or someone may enter the application information into the form from the received mail. The application information also may be received through a voice call and entered into the form by an operator or keyed in by the applicant using the phone keypad.

The web portal may cause presentation of a user interface window, which may include a plurality of menus and selectors such as drop down menus, buttons, text boxes, hyperlinks, etc. associated with the application. The web portal further may accept an electronic signature from the applicant through the user interface window. As the applicant interacts with the web portal, different user interface windows may be presented to provide the applicant with additional questions related to their ability to perform the task. Thus, as known to a person of skill in the art, applicant qualification application 506 receives application information associated with the interaction by the applicant with a user interface window presented under control of applicant qualification application 506. As examples, a motor carrier (MC) number, applicant phone number, Federal tax identification number (FEIN), insurance carrier and phone number, etc. may be requested from the applicant. The applicant may be notified if required information is not entered.

In an operation 602, identifier information is extracted from the received application. Identifier information may include an applicant name, social security number, driver's license number, Federal motor carrier identification number, U.S. Department of Transportation number, special Federal motor carrier safety administration (FMCSA) unique identifier, etc.

In an operation 604, a database query is created to a third party database system such as first database system 132, second database system 134, or third database system 136 of the plurality of third party database systems 108. The database query may include the extracted identifier information so that information related to the applicant can be obtained from the third party database system to determine the applicant's qualification for performing the task. Example third party databases include FMCSA's database, CSA's database, Work Number, D&B's database, Hire Rite's database, Experian's database, etc. The FMCSA and CSA databases include safety measures assigned to carriers and individual drivers that provide a measure from which shippers can determine the safety of an entity. The Hire Rite and Work Number databases provide background check information on drivers for accidents, criminal activity, certifications, etc. for drivers.

In an operation 606, the created database query is sent to the third party database system. For example, an XML Request may be sent to a web service at a specific URL setup to receive the XML request. As another example, a query is sent using a method supported by the Internet data interchange which was developed to scrape data from websites. In an operation 608, a response is received from the third party database system. The response may include data items related to the applicant's driving or safety record, financial status, insurance coverage, criminal history, special skill certification, registered equipment, etc.

As an example, a motor vehicle response may include information related to the applicant's name, address, license number, date of birth, gender, height, weight, hair color, known aliases, driver's license number, class of driver's license, issuance date, expiration date, current status (i.e., valid/invalid), restrictions, vehicle weight, endorsements, history of license suspensions or revocations, etc. As another example, a transportation employment history response may include information related to the applicant's social security number (SSN), full name, previous employers, date of birth, phone number, date of filing, duration of employment, driver's license number, eligible for rehire status, reason for leaving, status (i.e., lease driver), driver's experience, equipment operated, loads hauled, work record, etc. A commercial driver's license information system may respond with information related to the applicant's SSN, full name, date of birth, gender, height, weight, eye color, driver's license number and state, previous driver's license number and state, etc. A criminal widescreen response may include information related to the applicant's name, date of birth, request date, order number, request number, etc. A SSN response may include information related to the applicant's SSN, state, year of issue, if the SSN is in a valid range, if the SSN is reported as deceased, etc. A drug and alcohol response may include information related to the applicant's name, SSN, any drug information on file, etc.

In an operation 610, the response is stored, for example, in fourth computer readable medium 500 and/or in database 114 of server computing device 112. The data items may be extracted from each response and stored in a record associated with the applicant where the applicant's record includes a plurality of data fields containing a value related to each data item. The applicant's record includes the response information as well as the information received from the applicant in operation 600. For example, the applicant's record may include: a number of employers, a number of employers for whom the applicant has worked more than three years, a driver type, a company name, a pre-advisor ratio, pre-advisor score, military service information, position for which applying, license denial information, post advisor ratio, post advisor score, age, education, disqualification information, work history, material hauling experience, accident information, drug and alcohol usage, etc.

In an operation 612, a determination is made concerning whether or not another third party database system should be sent a database query. If another third party database system should be sent a database query, processing continues at operation 602 to possibly extract additional identifier information based on the third party database system and to send the database query, to receive the response, and to store the response. For example, a first database including a driver's safety record may be queried, a second database including a driver's credit report may be queried, and a third database including a driver's criminal activity may be queried. If another third party database system should not be sent a database query, processing continues at an operation 614.

In operation 614, applicant qualification information received from the third party database system(s) and the application is compared to a task qualification criterion. For example, a decision engine may be executed to calculate a score for the applicant based on the information received. A numerical value may be associated with a value associated with each data item stored in the applicant's record. As another option, weights may be associated with each data item so that the numerical value is the weight multiplied by the value associated with each data item in the applicant's record. The numerical values may be added to determine the score for the applicant. As another option, the application may be rejected based on an event such as a felony conviction, lack of insurance, excessive CSA safety score, etc.

Thus, as an example in calculating a score for the applicant, a plurality of fields in various categories are evaluated, a weight is applied to each evaluated field, and a final overall score is calculated for an applicant and compared to a threshold value to determine if the applicant is eligible to perform the task. If the field includes a numeric value, of course, the value can be directly compared to one or more threshold values using mathematical comparators such as equal, greater than, greater than or equal, less than, less than or equal. For example, an age of the applicant may be evaluated to determine in which age range the applicant falls, where different age ranges result in different score values. If the field includes a text field, a string comparison for one or more text strings may be used. For example, a drug test field may be evaluated to determine if the text field includes the string "pos" or "positive". The application may be color coded based on the score to allow the evaluator to easily see the highest rated candidates.

As an illustration, the following table includes example categories and points included in the score based on an evaluation of the value in the field relative to the table values:

| | Category | Points |
|---|---|---|
| 1. | Age | |
| | a. 25+ | 4 |
| | b. 24 to 25 | 2 |
| | c. Under 23 | Disqualified |
| 2. | Semi Experience | |
| | a. 5 years+ | 6 |
| | b. 2 to 5 years | 2 |
| | c. Under 2 years | Disqualified |
| 3. | Driving Record | |
| | a. No DUI or Reckless Driving | 5 |
| | b. DUI or Reckless Conviction | Disqualified |
| 4. | Moving Violations (last 3 years) | |
| | a. Clear Driving Record | 5 |

-continued

| | Category | Points |
|---|---|---|
| | b. 1 moving violation | 4 |
| | c. 2 moving violations | 3 |
| | d. 3 moving violations | 2 |
| | e. 4 moving violations | 0 |
| | f. 5 or more moving violations | Disqualified |
| 5. | Moving Violations (last 12 months) | |
| | a. Clear Driving Record | 5 |
| | b. 1 moving violation | 3 |
| | c. 2 moving violations | 0 |
| | d. 3 or more moving violations | Disqualified |
| 6. | Accidents (last 3 years) | |
| | a. No accidents | 7 |
| | b. 1 accident | 4 |
| | c. 2 or more | 0 |
| | d. Accident with fatality, medical evacuation, or disabled vehicle | Disqualified |
| 7. | Drug & Alcohol Violations (last 3 years) | |
| | a. No Positives | 3 |
| | b. Positives | Disqualified |
| 8. | Criminal Activity | |
| | a. Clear Criminal Background | 5 |
| | b. Any felony or criminal activity | 0 |
| 9. | Job History | |
| | a. Excellent: 1 Employer in the last 3 years. | 5 |
| | b. Average: 2 Employers in the last 3 years. | 4 |
| | c. Questionable: 3 Employers in the last 3 years. | 2 |
| | d. Not Good: 4 or more Employers in the last 3 years. | 0 |
| Maximum Points available | | 45 points |

A threshold may be defined as the task qualification criterion, which qualifies the applicant to perform the task. If the applicant's score exceeds the threshold, the applicant may be determined to be qualified. Of course, other methods may be used for comparing the applicant information to the task qualification criterion to determine if the applicant is qualified. For example, a data item may be compared to a specific criterion to determine if that data item includes an acceptable result. If not, the applicant may be determined to be disqualified. Thus, if the applicant had five accidents, this may disqualify them from performing the task regardless of the value associated with the remaining data items. Additionally, after calculating the applicant's score, the applicant may be rated. For example, if the applicant's score is below a first threshold, the applicant may be rated as minimally qualified; if the applicant's score is above the first threshold and below a second threshold, the applicant may be rated as qualified; and if the applicant's score is above the second threshold, the applicant may be rated as highly qualified.

In an operation 616, a determination is made concerning whether or not the applicant is qualified to perform the task based on the comparison. For example, if the applicant's score exceeds the threshold or is equal to or greater than the threshold, the applicant may be determined to be qualified. If the applicant is qualified, processing continues at an operation 622. If the applicant is not qualified, processing continues at an operation 618.

In operation 618, an indication of the disqualification is associated with the application and stored, for example, in fourth computer readable medium 500 and/or in database 114 of server computing device 112. In an operation 620, a rejection notification is sent to the applicant. For example, an electronic mail (email) message may be automatically sent to the applicant using an email address provided by the applicant through the web portal. As another option, the rejection notification may be sent to the applicant via regular mail or a fax modem using information provided by the applicant through the web portal. As still another option, a call may be automatically placed to the applicant notifying them of the rejection using a phone number provided by the applicant through the web portal. As yet another option, the rejection may be posted to the web portal for review by the applicant. The applicant information including the indication of the disqualification may be stored for a predetermined period of time so that the data is stored if the applicant reapplies.

In operation 622, electronic documents are created for completion by the applicant. The electronic documents may be forms that are automatically populated with the appropriate information from the applicant's record. The electronic documents may include previous employment verification forms, pre-hire documents, orientation documents, etc.

In an operation 624, the created documents are sent to the applicant, for example, using the email address or a fax phone number provided by the applicant through the web portal. For example, the forms may be created using macros executing with a word processor to create a document that is sent as an email attachment to the applicant's email address. The documents may be presented to the applicant in the web portal to be completed and signed electronically. The applicant further may be notified of their qualification via email, facsimile, web portal post, phone call, etc. and instructed to sign and return the created documents.

Figure 6A:
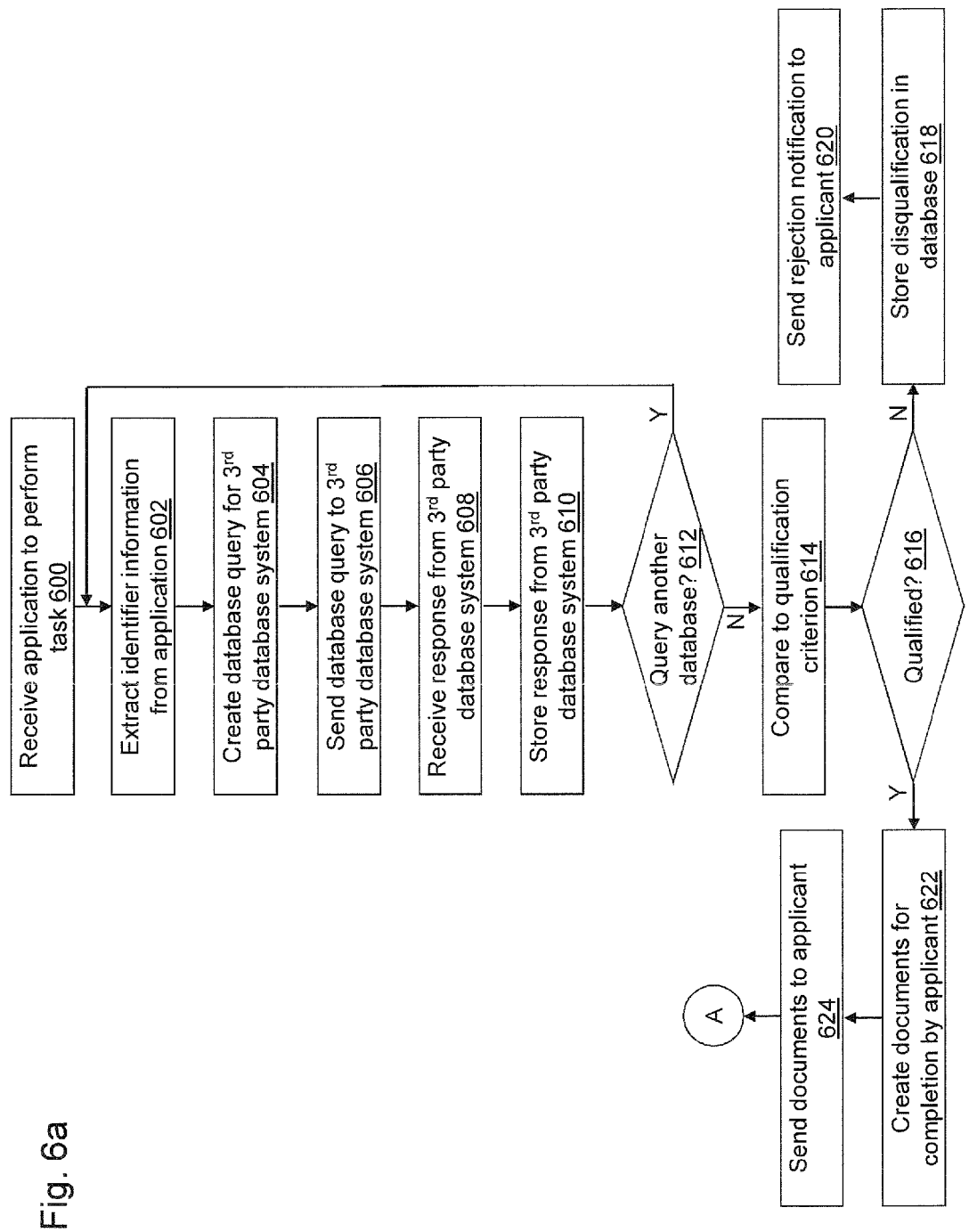
FIGS. 6a, 6b, 6c, and 6d depict flow diagrams illustrating example operations performed by an applicant qualification application of the data processing system of FIG. 5 in accordance with an example embodiment.
Figure 6B:
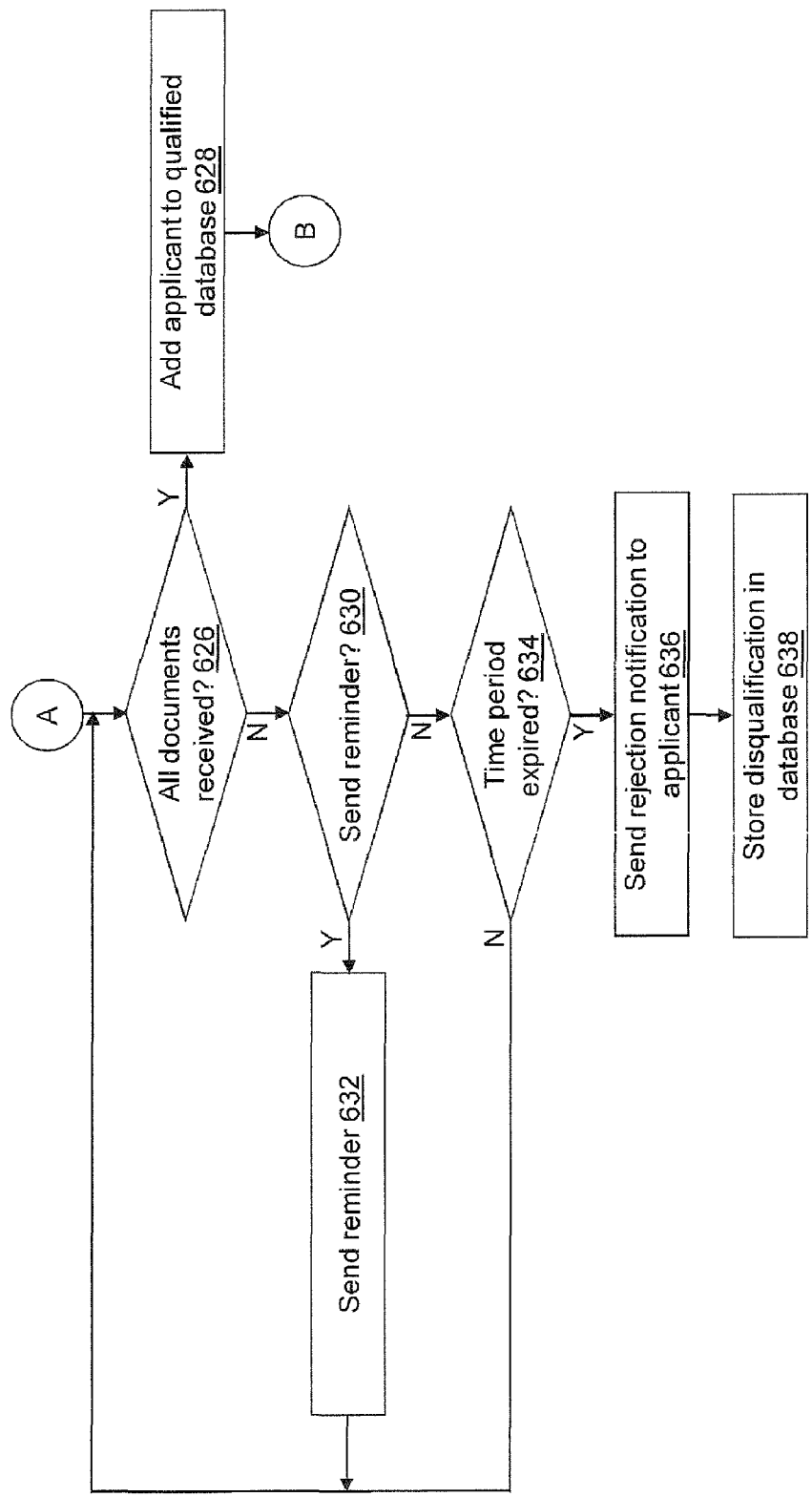

With reference to FIG. 6b, in an operation 626, a determination is made concerning whether or not all of the created documents have been received from the applicant. For example, the executed and/or signed documents may be received from the applicant via email or facsimile as electronic documents. The electronic documents may be inventoried using a bar code that provides a motor carrier number or the applicant's SSN as well as the document type. An optical character recognition process may be used to read the electronic documents to ensure completeness and to read indexes without the use of a bar code, if a document is not completed electronically. Documents may be sent as single or multiple attachments. An electronic representation of the applicant's signature may be captured and affixed to the electronic documents. The received documents may be stored and associated with the applicant's record.

Figure 6C:
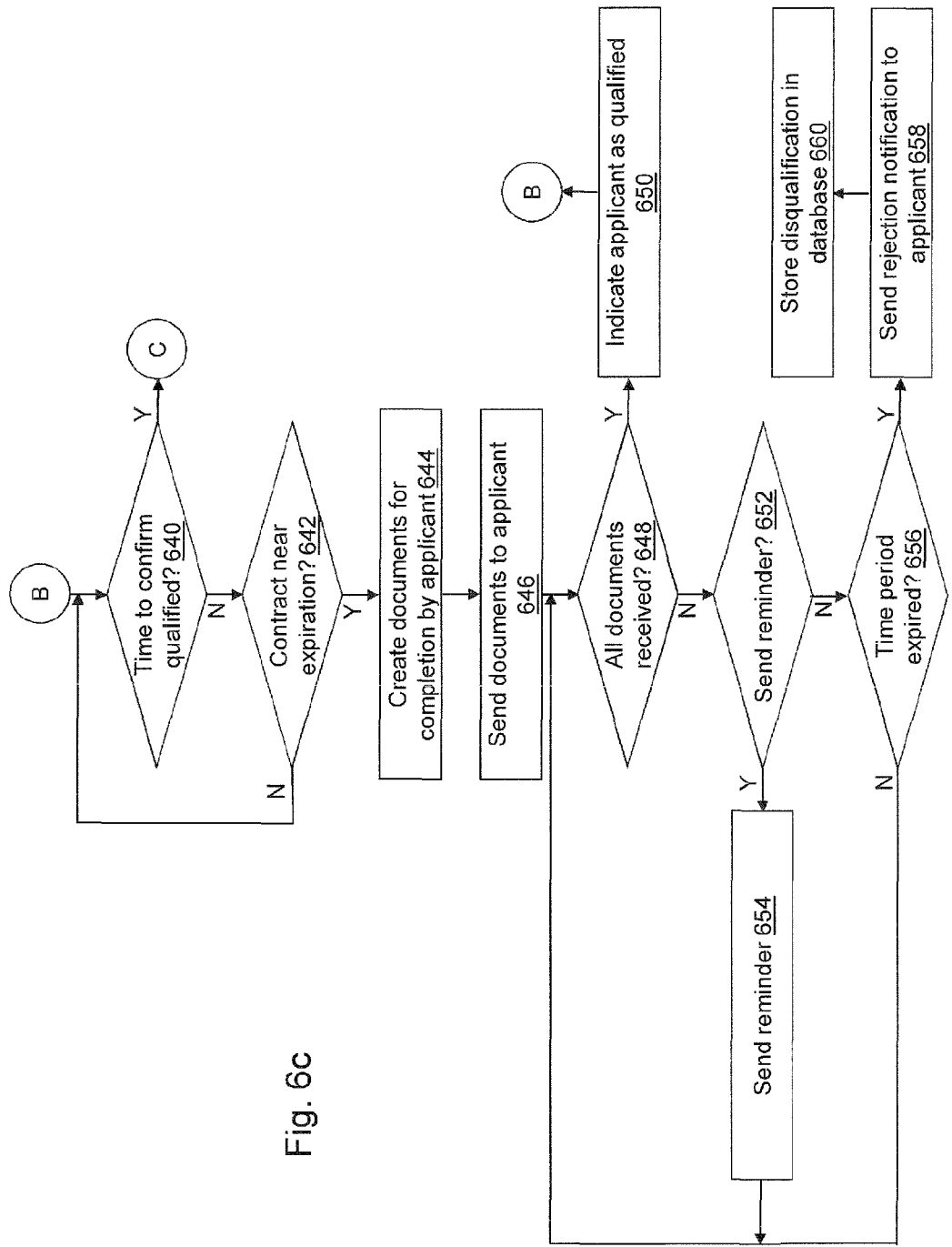

If all of the documents have been received, the applicant is added to the qualified database, in an operation 628, and processing continues at an operation 640 shown with reference to FIG. 6c. Once the applicant is added to the qualified database, the applicant can be selected or dispatched to perform the task. Thus, the qualified database may be queried for an eligible applicant when a new freight order is received. The applicant may attend an orientation session before being added to the qualified database.

If all of the documents have not been received, processing continues in an operation 630. The determination may be performed by querying the applicant's record to determine if all of the documents have been received.

In operation 630, a determination is made concerning whether or not a reminder should be sent to the applicant. For example, reminders may be sent at predetermined time intervals after sending the created documents to the applicant. As another option, reminders may be sent based on an expiration date associated with the created documents. The expiration date may differ between the created documents such that a first expiration date for a first document of the created documents occurs earlier in time than a second expiration date for a second document of the created documents. Reminders may be sent at predetermined time intervals prior to the expiration date. For example, reminders may be sent weekly or at any other defined time interval.

If a reminder should be sent to the applicant, a reminder is sent in an operation 632, and processing continues at operation 626. For example, a reminder may be sent using the email address or the fax phone number provided by the applicant through the web portal.

If a reminder should not be sent to the applicant, processing continues at an operation 634. In operation 634, a determination is made concerning whether or not a time period has expired during which the completed documents must have been received from the applicant. If the time period has not expired, processing continues at operation 626.

If the time period has expired, processing continues at an operation 636. In operation 636, a rejection notification is sent to the applicant in a manner similar to that described with reference to operation 620 though the notification may state a different reason for the rejection that is related to the expiration of the time period for returning the created documents. In an operation 638, an indication of the disqualification is associated with the application and stored, for example, in fourth computer readable medium 500 and/or in database 114 of server computing device 112.

With reference to FIG. 6c, the qualification of the applicant is monitored to confirm that the applicant remains qualified to perform the task. In operation 640, a determination is made concerning whether or not it is time to confirm that the applicant remains qualified. For example, the driving record of the applicant may be reviewed periodically. Additionally, the criminal record of the applicant may be reviewed periodically, but less frequently than the driving record. Thus, some or all of the qualification data may be reviewed at the same or different time intervals. In an illustrative embodiment, an expiration date is associated with each data item in the applicant's record. If the expiration date for a data item expires, the third party database from which the data item was extracted is queried to determine the current state of the data item.

Figure 6D:
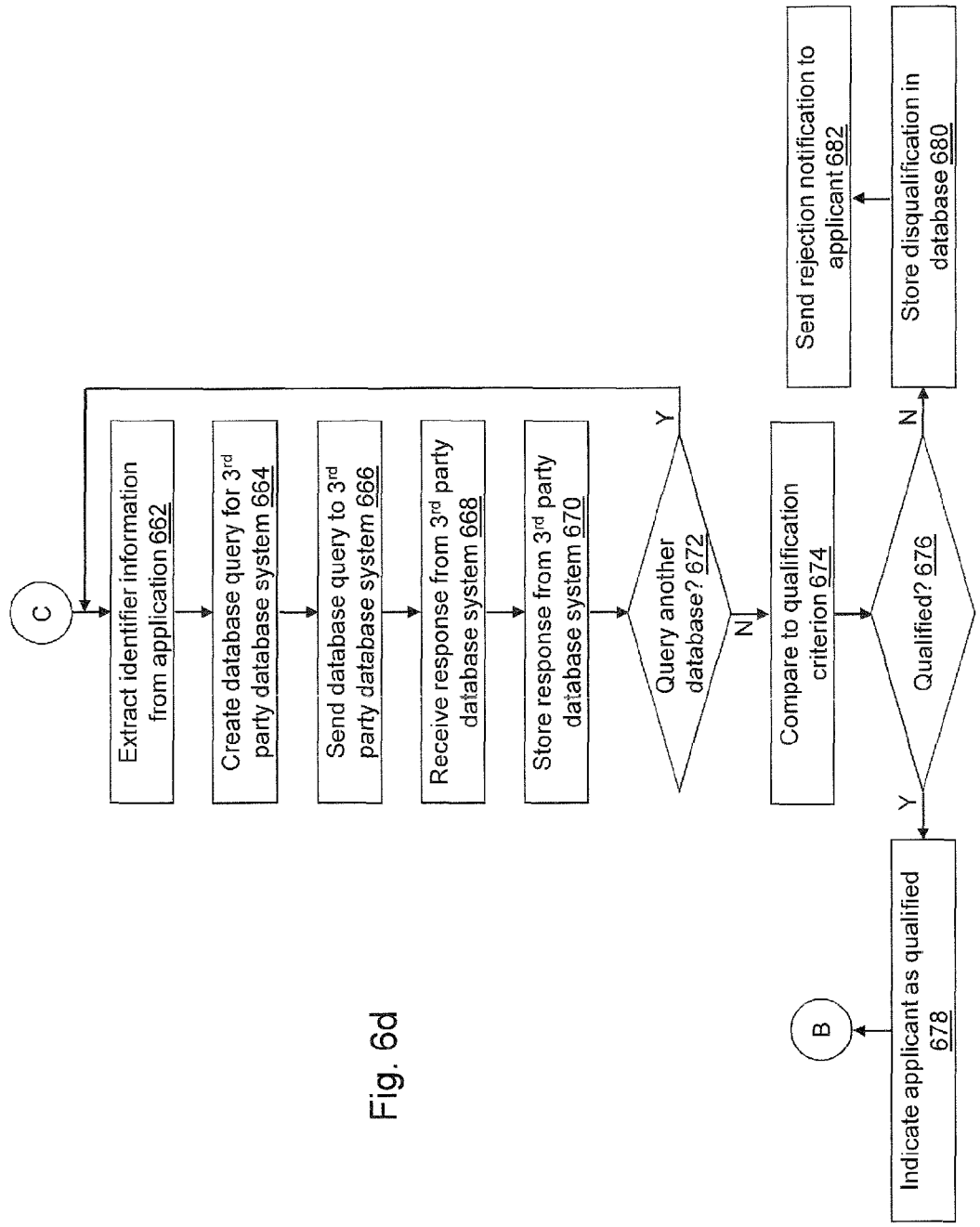

If it is time to confirm that the applicant remains qualified, processing continues in an operation 662 shown with reference to FIG. 6d. If it is not time to confirm that the applicant remains qualified, processing continues in an operation 642. In operation 642, a determination is made concerning whether or not a contract with the applicant is near an expiration date. If the contract with the applicant is near an expiration date, processing continues at an operation 644. If the contract with the applicant is not near an expiration date, processing continues at operation 640 to continue to monitor the qualifications of the applicant and the contract expiration date.

In operation 644, documents are created for completion by the applicant in a manner similar to that described with reference to operation 622. In an operation 646, the created documents are sent to the applicant in a manner similar to that described with reference to operation 624. In an operation 648, a determination is made concerning whether or not all of the created documents have been received from the applicant. If all of the documents have been received, the applicant is added to the qualified database, in an operation 650, and processing continues at an operation 640 shown with reference to FIG. 6c.

If all of the documents have not been received, processing continues in an operation 652. In operation 652, a determination is made concerning whether or not a reminder should be sent to the applicant in a manner similar to that described with reference to operation 630. If a reminder should be sent to the applicant, a reminder is sent in an operation 654, and processing continues at operation 648. If a reminder should not be sent to the applicant, processing continues at an operation 656. In operation 656, a determination is made concerning whether or not a time period has expired during which the completed documents must have been received from the applicant. If the time period has not expired, processing continues at operation 648. If the time period has expired, processing continues at an operation 658. In operation 658, a rejection notification is sent to the applicant in a manner similar to that described with reference to operation 636. In an operation 660, an indication of the disqualification is associated with the application and stored, for example, in fourth computer readable medium 500 and/or in database 114 of server computing device 112. The applicant may be removed from the qualified database so that the applicant cannot be dispatched to perform the task.

With reference to FIG. 6d, the qualification of the applicant to perform the task is confirmed. In an operation 662, identifier information is extracted from the received application in a manner similar to that described with reference to operation 602. In an operation 664, a database query is created to a third party database system in a manner similar to that described with reference to operation 604. In an operation 666, the created database query is sent to the third party database system in a manner similar to that described with reference to operation 606. In an operation 668, a response is received from the third party database system in a manner similar to that described with reference to operation 608. In an operation 670, the response is stored in a manner similar to that described with reference to operation 610.

In an operation 672, a determination is made concerning whether or not another third party database system should be sent a database query. If another third party database system should be sent a database query, processing continues at operation 662. If another third party database system should not be sent a database query, processing continues at an operation 674. In operation 674, applicant qualification information received from the third party database system(s) and the application is compared to a task qualification criterion in a manner similar to that described with reference to operation 614. Thus, nonconforming or soon to be nonconforming data elements, as compared to predetermined requirements, may be identified. A non-conforming determination may be based on the item being tracked. For example, non-conformance of a driver's license may be based on the expiration date of the driver's license. Non-conformance of a CSA safety score may be based on the current score or a trend in the score leading to a specific percentage from being out of compliance. Non-conformance relative to on-time deliveries may be based on the number of late arrivals.

In an operation 676, a determination is made concerning whether or not the applicant is qualified to perform the task based on the comparison. If the applicant is qualified, processing continues at an operation 678. If the applicant is not qualified, processing continues at an operation 680. In operation 680, an indication of the disqualification is associated with the application and stored in a manner similar to that described with reference to operation 618. The applicant may be removed from the qualified database so that the applicant cannot be dispatched to perform the task. In an operation 682, a rejection notification may be sent to the applicant in a manner similar to that described with reference to operation 620. In operation 678, the applicant is added to the qualified database, and processing continues at an operation 640 shown with reference to FIG. 6c.

The embodiments have been described in relation to qualification of a driver or a carrier for transporting an item. Nevertheless, it should be appreciated that the described embodiments can be applied in non-transportation related industries.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, the use of "and" or "or" is intended to include "and/or" unless specifically indicated otherwise. The illustrative embodiments may be implemented as a method, apparatus, or article of manufacture using standard programming and/or engineering techniques to produce software, firmware, hardware, or any combination thereof to control a computer to implement the disclosed embodiments.

The foregoing description of example embodiments has been presented for purposes of illustration and of description. It is not intended to be exhaustive or to limit the invention to the precise form disclosed, and modifications and variations are possible in light of the above teachings or may be acquired from practice of the invention. The functionality described may be implemented in a single application or may be distributed among modules that differ in number and distribution of functionality from those described herein. Additionally, the order of execution of the functions may be changed depending on the embodiment. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A system comprising:
a processor; and
a computer-readable medium operably coupled to the processor, the computer-readable medium having computer-readable instructions stored thereon that, when executed by the processor, cause the system to
receive an application including applicant identifier information identifying an applicant;
extract the applicant identifier information from the received application;
create a query to a database including the extracted applicant identifier information;
send the created query to a database system using a network, wherein the database system stores data associated with the extracted applicant identifier information;
receive a response to the sent query from the database system using the network, the response including data associated with the applicant's qualification to perform a task; and
determine if the applicant is qualified to perform the task by comparing the data associated with the applicant's qualification to an overall predetermined qualification criterion, wherein the comparison includes calculating a score based on the value associated with at least one data item of the plurality of data items included in the data.

2. The system of claim 1, further comprising a communication interface configured to send the created query and to receive the response.

3. The system of claim 1, wherein the application is received from an applicant system using the network.

4. The system of claim 3, further comprising a communication interface configured to receive the application.

5. A non-transitory computer-readable medium having stored thereon computer-readable instructions that when executed by a computing device cause the computing device to:
- receive an application including applicant identifier information identifying an applicant;
- extract the applicant identifier information from the received application;
- create a query to a database including the extracted applicant identifier information;
- send the created query to a database system using a network, wherein the database system stores data associated with the extracted applicant identifier information;
- receive a response to the sent query from the database system using the network, the response including data associated with the applicant's qualification to perform a task; and determine if the applicant is qualified to perform the task by comparing the data associated with the applicant's qualification to an overall predetermined qualification criterion, wherein the comparison includes calculating a score based on the value associated with at least one data item of the plurality of data items included in the data.

6. The computer-readable medium of claim 5, wherein the task is transporting a shipment using a motor vehicle.

7. The computer-readable medium of claim 5, wherein the applicant is a driver or a transportation carrier.

8. The computer-readable medium of claim 5, wherein the score includes a sum of the values associated with at least two data items of the plurality of data items.

9. The computer-readable medium of claim 5, wherein a weight is associated with the at least one data item of the plurality of data items and the score includes the value multiplied by the weight associated with the at least one data item of the plurality of data items.

10. The computer-readable medium of claim 9, wherein the score includes a sum of the values multiplied by the weights associated with at least two data items of the plurality of data items.

11. The computer-readable medium of claim 10, wherein the overall predetermined qualification criterion is a threshold value and the applicant is determined as qualified to perform the task based on a comparison between the score and the threshold value.

12. The computer-readable medium of claim 5, wherein the computer-readable instructions further cause the computing device to:
- send the created query to the database system using the network at a predefined time interval after determining if the applicant is qualified to perform the task;
- receive a second response to the sent query from the database system using the network, the response including second data associated with the applicant's qualification to perform the task; and
- determine if the applicant remains qualified to perform the task by comparing the second data associated with the applicant's qualification to the overall predetermined qualification criterion.

13. The computer-readable medium of claim 12, wherein the predefined time interval is based on the database system.

14. The computer-readable medium of claim 5, wherein the computer-readable instructions further cause the computing device to populate documents using applicant information included in the data and with the received application if the applicant is determined as qualified to perform the task.

15. The computer-readable medium of claim 5, wherein the computer-readable instructions further cause the computing device to add the applicant to a qualified applicant database if the applicant is determined as qualified to perform the task.

16. The computer-readable medium of claim 5, wherein the comparison includes comparing a value associated with each data item of a plurality of data items included in the data with a predetermined qualification criterion defined for each data item.

17. The computer-readable medium of claim 16, wherein the comparison further includes calculating a number of the data items of the plurality of data items that satisfy the predetermined qualification criterion defined for that data item.

18. The computer-readable medium of claim 17, wherein the overall predetermined qualification criterion is a threshold value and the applicant is determined as qualified to perform the task based on a comparison between the number of the data items and the threshold value.

19. A method of automatically determining if an applicant is qualified to perform a task, the method comprising:
- receiving an application including applicant identifier information identifying an applicant by a computing device;
- extracting, by the computing device, the applicant identifier information from the received application;
- creating, by the computing device, a query to a database including the extracted applicant identifier information;
- sending, by the computing device, the created query to a database system using a network, wherein the database system stores data associated with the extracted applicant identifier information;
- receiving, by the computing device, a response to the sent query from the database system using the network, the response including data associated with the applicant's qualification to perform a task; and
- determining, by the computing device, if the applicant is qualified to perform the task by comparing the data associated with the applicant's qualification to an overall predetermined qualification criterion, wherein the comparison includes calculating a score based on the value associated with at least one data item of the plurality of data items included in the data.

* * * * *